(12) United States Patent
Yoneoka

(10) Patent No.: US 10,534,576 B2
(45) Date of Patent: Jan. 14, 2020

(54) OPTIMIZATION APPARATUS AND CONTROL METHOD THEREOF

(71) Applicant: FUJITSU LIMITED, Kawasaki-shi, Kanagawa (JP)

(72) Inventor: Noboru Yoneoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/248,028

(22) Filed: Jan. 15, 2019

(65) Prior Publication Data

US 2019/0235834 A1  Aug. 1, 2019

(30) Foreign Application Priority Data

Feb. 1, 2018 (JP) .................................. 2018-016705

(51) Int. Cl.
| | | |
|---|---|---|
| *G06F 17/11* | (2006.01) | |
| *G06F 7/58* | (2006.01) | |
| *G06F 5/06* | (2006.01) | |
| *G06F 15/82* | (2006.01) | |
| *G06F 3/0484* | (2013.01) | |
| *G06N 7/00* | (2006.01) | |

(52) U.S. Cl.
CPC .......... *G06F 5/065* (2013.01); *G06F 3/04842* (2013.01); *G06F 7/58* (2013.01); *G06F 15/82* (2013.01); *G06F 17/11* (2013.01); *G06N 7/00* (2013.01)

(58) Field of Classification Search
None
See application file for complete search history.

(56) References Cited

U.S. PATENT DOCUMENTS

| | | | | |
|---|---|---|---|---|
| 6,113,033 A | * | 9/2000 | Parks | B64G 1/283 244/165 |
| 10,387,758 B2 | * | 8/2019 | Dustin | G06K 15/1856 |
| 2009/0121215 A1 | * | 5/2009 | Choi | G06N 10/00 257/31 |
| 2015/0063011 A1 | * | 3/2015 | Chen | G11C 11/1675 365/158 |
| 2017/0109605 A1 | * | 4/2017 | Ahn | G06N 3/0454 |
| 2017/0220924 A1 | | 8/2017 | Danjo et al. | |
| 2018/0073866 A1 | * | 3/2018 | Tarabrin | G01B 11/272 |

FOREIGN PATENT DOCUMENTS

| | | |
|---|---|---|
| JP | H01-205233 | 8/1989 |
| JP | H05-250346 | 9/1993 |
| JP | 2017-138760 | 8/2017 |

* cited by examiner

*Primary Examiner* — Hyun Nam
(74) *Attorney, Agent, or Firm* — Fujitsu Patent Center

(57) ABSTRACT

A storage unit holds context information including a minimum energy state, a current state, a minimum energy, a current energy, a temperature, and a bias about each of a plurality of trials. A control unit includes a counting unit counting update processing repeated in each trial and another counting unit counting trials performed. The control unit repeats update control about the update processing a certain number of times in each trial on the context information, based on spin information and an update target energy change. A calculation unit calculates energy change candidates based on a generated random number, a stored weight, the spin information, and the current state and temperature updated by the update control. A selection unit selects the update target energy change from the candidates calculated by the calculation unit based on a random number.

9 Claims, 13 Drawing Sheets

| en$_a$ | en$_b$ | r | o |
|---|---|---|---|
| T | T | 0 | a |
| T | T | 1 | b |
| T | F | d/c | a |
| F | T | d/c | b |
| F | F | 0 | a |
| F | F | 1 | b |

FIG. 6

OPTIMIZATION APPARATUS AND CONTROL METHOD THEREOF

CROSS-REFERENCE TO RELATED APPLICATION

This application is based upon and claims the benefit of priority of the prior Japanese Patent Application No. 2018-016705, filed on Feb. 1, 2018, the entire contents of which are incorporated herein by reference.

FIELD

The embodiments discussed herein relate to an optimization apparatus and a control method thereof.

BACKGROUND

Neumann computers are not very suitable for solving multivariable optimization problems. However, to solve these problems, there is a method which uses an optimization apparatus (which could also be referred to as an ising device or a Boltzmann machine) that uses an ising energy function. The optimization apparatus performs calculation by replacing a problem to be calculated with an ising model, which is a model representing the behavior of magnetic spins.

The optimization apparatus determines the value (+1 or −1 (corresponding to the direction of a spin)) of an individual quantum bit, which will simply be referred to as a bit, included in an ising model, based on the values of the other bits, weight coefficients, each of which indicates a weight with respect to one of the other bits, and a bias. The weight coefficients and bias are constants determined based on the optimization problem to be calculated. For example, the optimization apparatus performs simulated annealing (SA) or the like to obtain, as a solution, a combination of bit values that achieves the minimum value of the above energy function.

See, for example, Japanese Laid-open Patent Publication No. 05-250346 and Japanese Laid-open Patent Publication No. 2017-138760.

In SA, in an individual trial that uses a different temperature, initial state, etc., update processing in which the value of one of a plurality of bits is updated is repeated many times. When an optimization apparatus that solves an optimization problem by using SA is realized by logic circuits, since a plurality of kinds of calculation processing are performed per update processing, a plurality of clock cycles are needed. Namely, the calculation efficiency of this kind of optimization apparatus is low.

SUMMARY

According to one aspect, there is provided an optimization apparatus including: a storage unit that holds context information including a minimum energy state, a current state, a minimum energy, a current energy, a temperature, and a bias about each of a plurality of trials; a control unit that includes a repetition number counting unit for counting how many times update processing has been repeated in the each of the plurality of trials and a trial number counting unit for counting how many trials have been performed and that repeats update control about the update processing a certain number of times in the each of the plurality of trials on the context information stored in the storage unit, based on spin information and an update target energy change; a calculation unit that calculates a plurality of energy change candidates, based on a generated random number, a stored weight, the spin information, and the current state and the temperature that have been updated by the update control; and a selection unit that selects the update target energy change from the plurality of energy change candidates calculated by the calculation unit, based on a random number.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a truth table illustrating examples of data inputted to and outputted from a selection processing unit.

DESCRIPTION OF EMBODIMENTS

Figure 1:
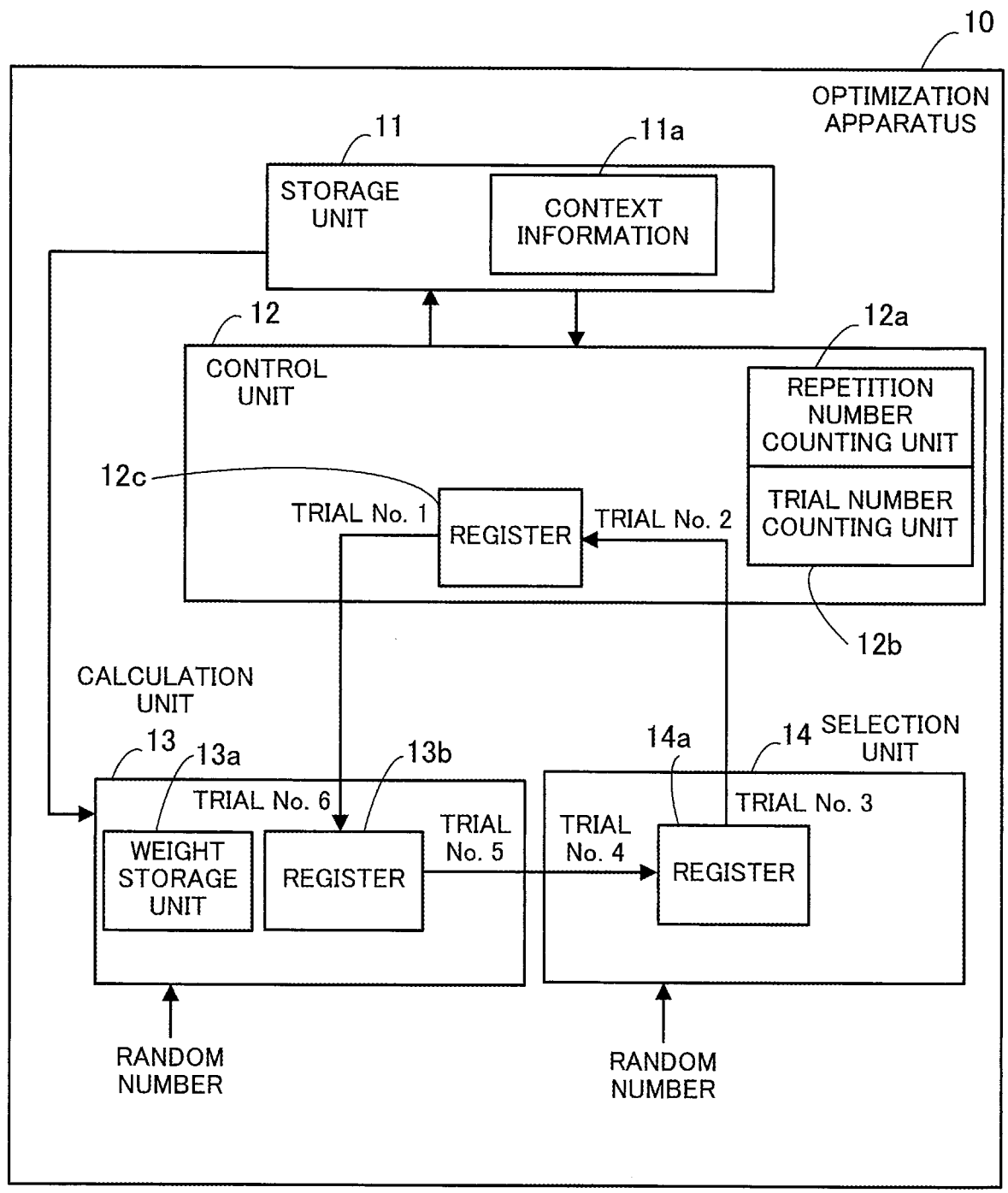
FIG. 1 illustrates an example of an optimization apparatus according to a first embodiment.

Hereinafter, embodiments will be described with reference to the accompanying drawings, wherein like reference characters refer to like elements throughout.

First Embodiment

Optimization apparatuses described below calculate optimization problems by using an ising energy function $E(x)$, which is defined, for example, by the following formula (1).

$$E(x) = -\sum_{\langle i,j \rangle} W_{ij} x_i x_j - \sum_i b_i x_i \tag{1}$$

The first term on the right side in formula (1) represents all the combinations of two bits selectable from all the bits without missing or redundantly counting any bit. More specifically, the first term represents the sum of products, each of which is a result of multiplication of one bit value, another bit value, and a corresponding weight coefficient. In formula (1), $x_i$ denotes the value (a state variable) of the i-th bit, $x_j$ denotes the value of the j-th bit, $W_{ij}$ denotes a weight coefficient that indicates a weight (for example, coupling strength) between the i-th and j-th bits. In formula (1), $W_{ij}=W_{ji}$, $W_{ii}=0$.

The second term on the right side in formula (1) represents the sum of products, each of which is a result of multiplication of the bias of an individual bit and the corresponding bit value. In formula (1), $b_i$ denotes the bias of the i-th bit.

Hereinafter, two bit values −1 and +1 will be considered as 0 and 1, respectively, to associate these values with signal values (0 and 1) used in logic circuits.

FIG. 1 illustrates an example of an optimization apparatus 10 according to a first embodiment.

The optimization apparatus 10 includes a storage unit 11, a control unit 12, a calculation unit 13, and a selection unit 14.

The storage unit 11 holds context information 11a that includes a minimum energy state, a current state, a minimum energy, a current energy, temperatures, and biases for each of a plurality of trials.

The minimum energy state in a trial is a combination of values of the individual bits obtained when the energy function as expressed by formula (1) represents the minimum value (energy) in the update processing that has been performed so far in the trial. The current state in a trial is a combination of values of the individual bits obtained at the current repetition number in the trial. The temperatures in a trial are temperature parameters used in SA in the trial. The biases are biases (for example, $b_i$) included in the above formula (1).

The initial values of the context information are supplied from, for example, the outside of the optimization apparatus 10. In addition, the context information is updated when SA is performed in an individual trial.

The storage unit 11 is a volatile storage device such as a random access memory (RAM) or a non-volatile storage device such as a flash memory.

The control unit 12 includes a repetition number counting unit 12a that counts how many times update processing has been repeated in each trial and a trial number counting unit 12b that counts how many trials have been performed.

In SA or a replica exchange method, which is an application example thereof, in an individual trial that uses a different temperature, initial state, etc., update processing in which the value of one of a plurality of bits is updated is repeated many times. The following description assumes that the trial number is M and the repetition number is N. For example, N=1,000,000, and M=100.

The control unit 12 repeats update control, which is repeated a certain number (N) of times in each of the (M) trials on the context information 11a stored in the storage unit 11, based on spin information and an update target energy change.

The update control is control about update processing performed by using the control unit 12, the calculation unit 13, and the selection unit 14 to realize SA. An example of the update control is control for dropping the temperature each time the update processing is performed a certain number of times to realize SA. Another example of the update control is control for updating the energy and state (a combination of values of the individual bits) based on spin information and an update target energy change. The spin information includes information indicating the bit whose spin direction needs to be updated (namely, whether to update the value of a bit). The update target energy change will be described below.

This control unit 12 is realized by using various kinds of logic circuits such as counters, selectors, and registers.

The calculation unit 13 calculates a plurality of energy change candidates based on a random number generated by a random number generation unit (not illustrated), weight coefficients stored in a weight storage unit 13a, the spin information, and the current state and temperature updated by the update control.

For example, an energy change $\Delta E_i$ associated with a spin flip of the i-th bit is expressed by the following formula (2).

$$\Delta E_i = (2x_i - 1) \cdot \left( \sum_j W_{ij} x_j + b_i \right) \quad (2)$$

In formula (2), when the value $x_i$ of the i-th bit is 1, $2x_i-1$ is 1. When the value $x_i$ is 0, $2x_i-1$ is −1. In addition, $h_i$ in the following formula (3) is called a local field and represents the rate of energy change due to a spin flip of an individual bit. The local field $h_i$ corresponds to an updated value of the bias $b_i$ in formula (1) (in other words, the local field $h_i$ in the initial state is the bias $b_i$).

$$h_i = \sum_i W_{ij} x_j + b_i \quad (3)$$

The calculation unit 13 calculates the energy change as described above per bit. In addition, based on a random number, the calculation unit 13 determines at least one of the energy changes corresponding to the bits used as a candidate (a candidate subtracted from or added to the current energy). For example, the calculation unit 13 calculates a threshold based on a random number and the current temperature. When an energy change is greater than the threshold, the energy change is used as a candidate. By calculating a threshold by using a random number, state change that results in some energy increase is allowed, and a solution obtained by calculating an optimization problem is allowed to escape from a local solution. In addition, under the control of the control unit 12, by gradually dropping the temperature and gradually reducing the variation range of the threshold, the solutions begin to converge into an optimal solution.

This calculation unit 13 is realized by using various kinds of logic circuits such as computing units (multipliers, adders, etc.), selectors, and registers.

The selection unit 14 selects an update target energy change from the plurality of energy change candidates calculated by the calculation unit 13 based on at least one random number. In SA using an ising model, in view of convergence, only one bit is made to change in association with a state transition. Thus, only one update target energy change is selected.

The selection unit 14 is realized by using various kinds of logic circuits such as selectors and registers.

By using the context information 11a about a plurality of trials stored in the storage unit 11, the optimization apparatus 10 as described above performs pipeline processing in which the plurality of trials are processed simultaneously. FIG. 1 illustrates an example in which six trials (trials No. 1 to No. 6) are simultaneously processed in the individual pipeline processing. In this case, since a latency L is equal to the number of stages of the pipeline processing, L=6. For simplicity, the following description assumes that the pipeline processing in each of the control unit 12, the calculation unit 13, and the selection unit 14 ends in two clock cycles.

FIG. 1 illustrates an example in which a register 12c of the control unit 12, a register 13b of the calculation unit 13, and a register 14a of the selection unit 14 are connected in a ring. The register 12c is connected between circuit units (not illustrated), each of which performs processing in one clock cycle, in the control unit 12. The register 13b is also connected between circuit units (not illustrated), each of which performs processing in one clock cycle, in the calculation unit 13. The register 14a is also connected between circuit units (not illustrated), each of which performs processing in one clock cycle, in the selection unit 14.

For example, in a certain clock cycle, trial data of trial No. 1 is processed in a circuit unit that performs processing in the second clock cycle in the control unit 12, and trial data of trial No. 2 is processed in a circuit unit that performs processing in the first clock cycle in the control unit 12. In addition, in this clock cycle, trial data of trial No. 3 is processed in a circuit unit that performs processing in the second clock cycle in the selection unit 14, and trial data of trial No. 4 is processed in a circuit unit that performs processing in the first clock cycle in the selection unit 14. In addition, in this clock cycle, trial data of trial No. 5 is processed in a circuit unit that performs processing in the second clock cycle in the calculation unit 13, and trial data of trial No. 6 is processed in a circuit unit that performs processing in the first clock cycle in the calculation unit 13.

In the next clock cycle, the trial data of trial No. 2 is processed in the circuit unit that performs processing in the second clock cycle in the control unit 12, and the trial data of trial No. 3 is processed in the circuit unit that performs processing in the first clock cycle in the control unit 12. In addition, in this clock cycle, the trial data of trial No. 4 is processed in the circuit unit that performs processing in the second clock cycle in the selection unit 14, and the trial data of trial No. 5 is processed in the circuit unit that performs processing in the first clock cycle in the selection unit 14. In addition, in this clock cycle, the trial data of trial No. 6 is processed in the circuit unit that performs processing in the second clock cycle in the calculation unit 13, and the trial data of trial No. 1 is processed in the circuit unit that performs processing in the first clock cycle in the calculation unit 13.

In this way, the data of the individual trials shift counterclockwise through the ring pipeline configured by the control unit 12, the calculation unit 13, and the selection unit 14 in the example in FIG. 1. The above processing is repeated on the individual trials.

When the repetition number in each of the trials counted by the repetition number counting unit 12a reaches N, the control unit 12 ends the processing on the trials. At this point, the control unit 12 outputs the energies and the states obtained after the N-th update processing on the trials. The control unit 12 may output the minimum energies among the energies obtained in the N-th update processing on the respective trials and the states corresponding to the minimum energies.

Next, the states, energies, biases (local fields), temperatures, etc. are initialized, and in the example in FIG. 1, like update processing is repeated on other six trials. After update processing is performed N times on each of the M trials, the optimization apparatus 10 ends the optimization processing.

For example, among the M energies of the M trials in each of which the update processing is performed N times, the state corresponding to the minimum energy is the solution of the optimization problem.

As described above, since the optimization apparatus 10 according to the first embodiment is able to process a plurality of trials simultaneously, the operating ratio of each of the control unit 12, the calculation unit 13, and the selection unit 14 is improved, and the calculation efficiency is improved.

Second Embodiment

Figure 2:
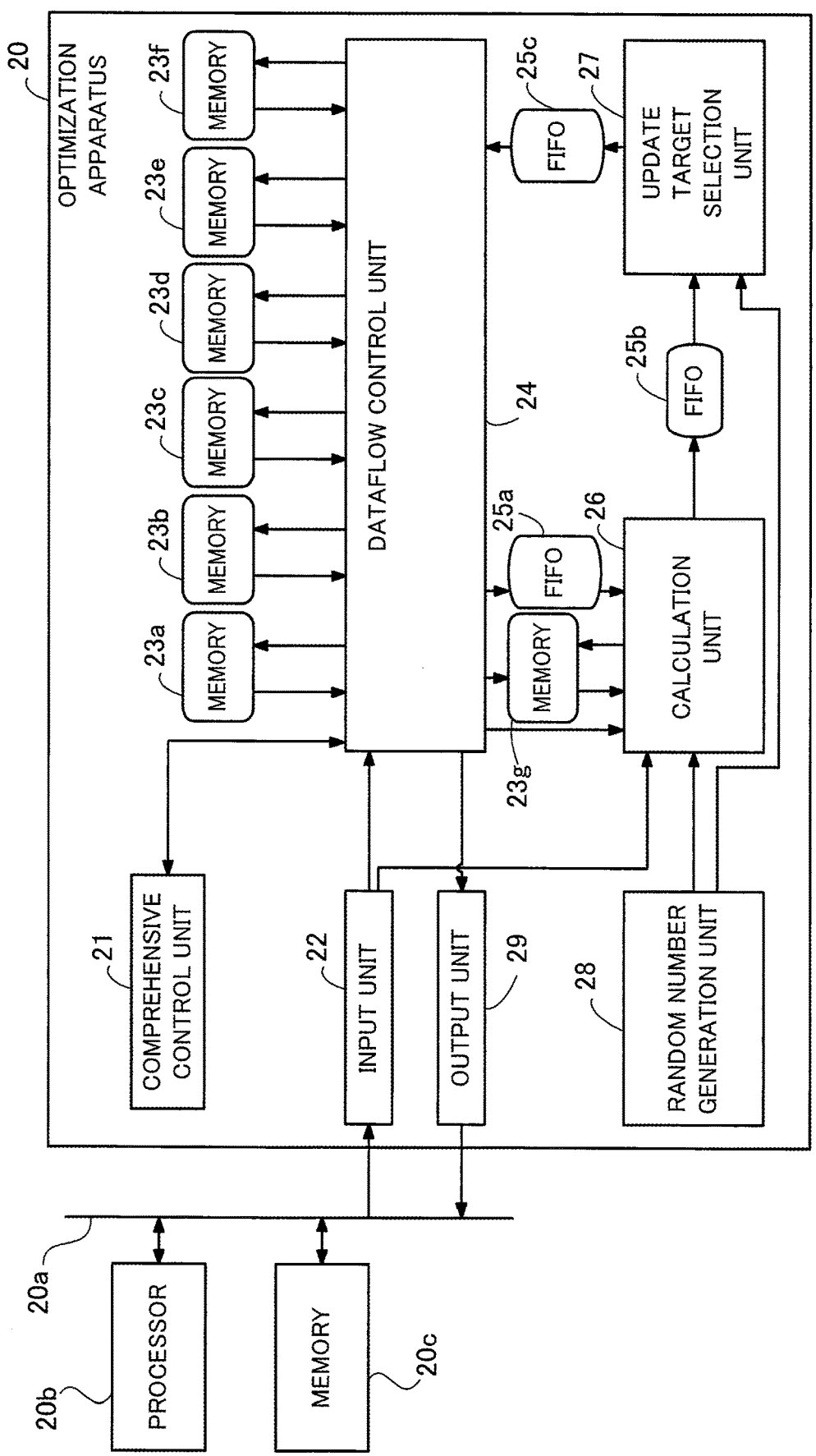
FIG. 2 illustrates an example of an optimization apparatus according to a second embodiment.

FIG. 2 illustrates an example of an optimization apparatus 20 according to a second embodiment.

The optimization apparatus 20 according to the second embodiment includes a comprehensive control unit 21, an input unit 22, memories 23a to 23g, and a dataflow control unit 24. In addition, the optimization apparatus 20 includes first-in first-out (FIFO) memories 25a to 25c (which will simply be referred to as FIFOs), a calculation unit 26, an update target selection unit 27, a random number generation unit 28, and an output unit 29. For example, the optimization apparatus 20 is realized by a single-chip semiconductor integrated circuit.

In addition, the optimization apparatus 20 is connected to a processor 20b and a memory 20c via a bus 20a.

The processor 20b performs various kinds of processing. For example, the processor 20b reads out data stored in the memory 20c and supplies the read data to the optimization apparatus 20 via the bus 20a. In addition, the processor 20b stores data outputted by the optimization apparatus 20 in the memory 20c via the bus 20a. The processor 20b is a calculation processing unit such as a central processing unit (CPU) or a digital signal processor (DSP). Alternatively, instead of the processor 20b, an electronic circuit for specific use such as an application specific integrated circuit (ASIC) or a field programmable gate array (FPGA) may be used. The processor 20b executes a program stored in the memory 20c.

In addition to the biases and weight coefficients, which are constants determined based on the optimization problem to be calculated, the memory 20c holds data such as initial values of states, energies, minimum energies, and offsets described below. The memory 20c is a volatile storage device such as a synchronous dynamic random access memory (SDRAM) or a non-volatile storage device such as a flash memory, an electrically erasable programmable read-only memory (EEPROM), or a hard disk drive (HDD).

In the optimization apparatus 20, the comprehensive control unit 21 controls activation and termination of the optimization apparatus 20. In addition, the comprehensive control unit 21 notifies the dataflow control unit 24 of the repetition number (N) and the trial number (M).

The input unit 22 receives data read from the memory 20c and supplies the data to the dataflow control unit 24.

The memories 23a to 23g hold context information. The following description assumes that each of the seven memories 23a to 23g holds one kind of context information. The memory 23a holds a current state per trial, and the memory 23b holds a current energy per trial. The memory 23c holds a current minimum energy per trial, and the memory 23d holds a state corresponding to the current minimum energy per trial. The memory 23e holds a current temperature per trial, and the memory 23f holds a current offset per trial. The memory 23g holds current biases (local fields) per trial.

For example, each of the memories 23a to 23g is a volatile storage device such as a RAM or a non-volatile storage device such as a flash memory.

Instead of the memories 23a to 23g, a single memory may be used.

The dataflow control unit 24 has the same function as that of the control unit 12 according to the first embodiment. Namely, the dataflow control unit 24 repeats update control a certain number (N) of times in each of the (M) trials on the context information stored in the memories 23a to 23g, based on spin information and an update target energy change. A configuration example of the dataflow control unit 24 will be described below.

The FIFO 25a holds data outputted by the dataflow control unit 24 for a predetermined clock cycle and outputs the data. The FIFO 25b holds data outputted by the calculation unit 26 for the predetermined clock cycle and outputs the data. The FIFO 25c holds data outputted by the update target selection unit 27 for the predetermined clock cycle and outputs the data. The predetermined clock cycle depends on the number of entries (which could also be called "depth") of each of the FIFOs 25a to 25c.

Each of the FIFOs 25a to 25c may include a different number of entries. Alternatively, the optimization apparatus 20 may include only one or two of the FIFOs 25a to 25c. Still alternatively, the optimization apparatus 20 may be configured without the FIFOs 25a to 25c.

The calculation unit 26 has the same function as that of the calculation unit 13 according to the first embodiment. Namely, the calculation unit 26 calculates a plurality of energy change candidates based on a random number generated by the random number generation unit 28, weight coefficients, spin information, and the current state and temperature updated by the update control. A configuration example of the calculation unit 26 will be described below. The spin information will be referred to as update target bit information.

The update target selection unit 27 has the same function as that of the selection unit 14 according to the first embodiment. Namely, the update target selection unit selects one update target energy change from the plurality of energy change candidates calculated by the calculation unit 26 based on at least one random number generated by the random number generation unit 28. A configuration example of the update target selection unit 27 will be described below.

The random number generation unit 28 generates at least one random number to be supplied to the calculation unit 26 and the update target selection unit 27. The random number generation unit 28 may generate a plurality of random numbers based on different seeds. For example, the random number generation unit 28 is realized by a linear feedback shift register (LFSR) or the like.

The output unit 29 outputs data generated by the dataflow control unit 24 to the outside of the optimization apparatus 20.

Example of Dataflow Control Unit 24

Figure 3:
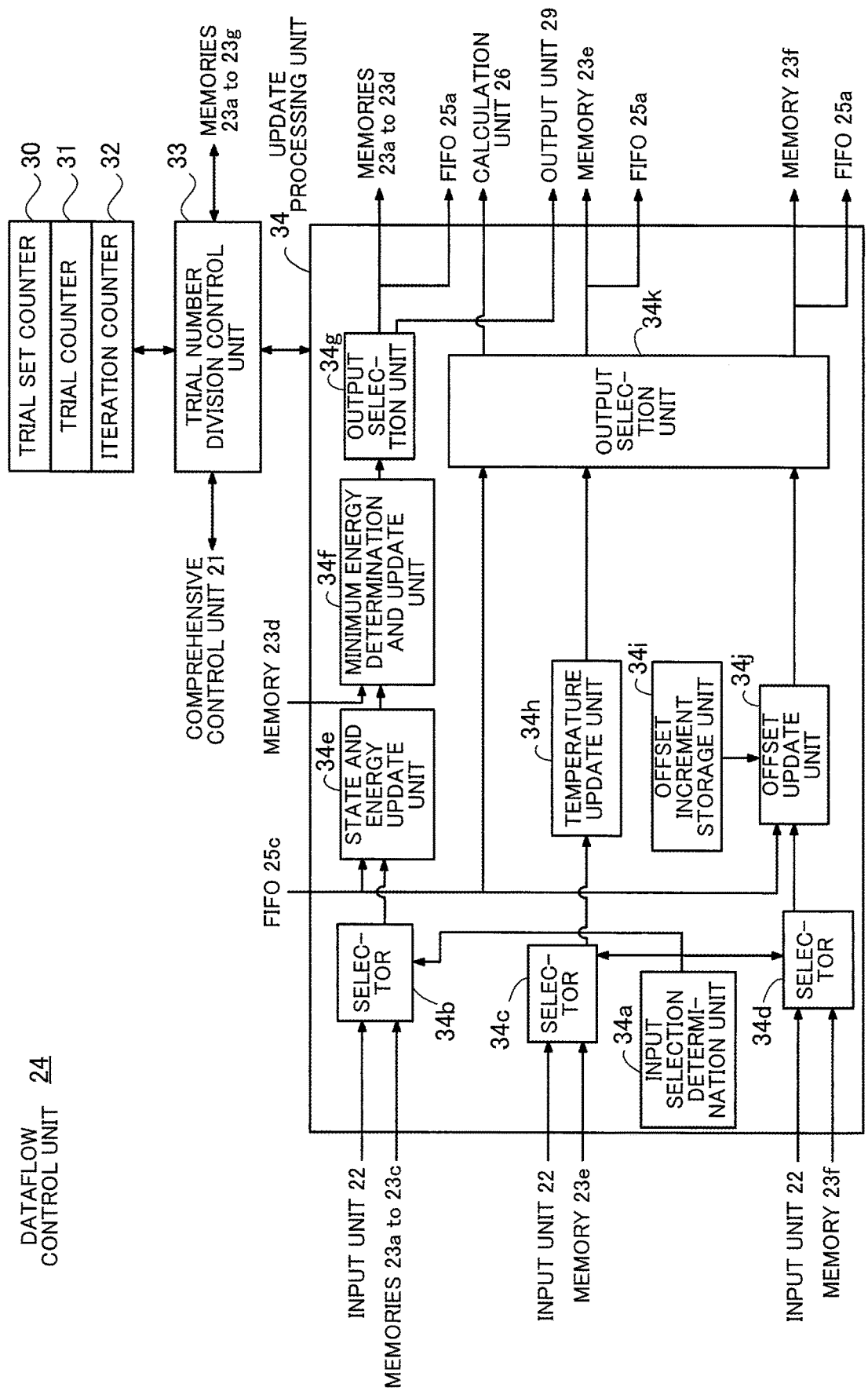
FIG. 3 illustrates an example of a dataflow control unit.

FIG. 3 illustrates an example of the dataflow control unit 24.

The dataflow control unit 24 includes a trial set counter 30, a trial counter 31, an iteration counter 32, a trial number division control unit 33, and an update processing unit 34.

The trial set counter 30 counts trial sets, each of which is a set (a group) of trials of the plurality of trials. The trial counter 31 counts how many trials have been performed. The iteration counter 32 counts how many times update processing has been repeated in each trial.

The trial number division control unit 33 performs control such that N (repetition number)×M (trial number) update processing is divided into ceil(M/L) sets in which N×L update processing is a set when the optimization apparatus 20 performs the update processing. The ceil(M/L) is a function of calculating a quotient when M is divided by L and rounding up the remainder.

As this L, a value which achieves the minimum M/L and with which 0 is produced as the remainder of M/L is used. When 0 is not produced as the remainder of M/L, L with which the remainder of M/L is the maximum is used in the range in which the minimum M/L is achieved.

The minimum value of L is a total number of clock cycles (latency) needed by the pipeline processing performed in the dataflow control unit 24, the calculation unit 26, and the update target selection unit 27. In addition, the maximum value of L is the smaller value of the upper limit of the number of trials whose context information is storable in the memories 23a to 23g and the sum of the minimum value of L and the number of entries of the FIFOs 25a to 25c.

By determining L in this way, it is possible to further increase the number of trials processed at one time and further improve the calculation efficiency.

The trial number division control unit 33 receives N and M, for example, from the comprehensive control unit 21. For example, each time the state, the energy, etc. are updated in the update processing unit 34, the trial number division control unit 33 determines that single update processing has been performed about single trial. Thus, the trial number division control unit 33 increments the value of the trial counter 31 by +1. When the value of the trial counter 31 reaches L−1, the trial number division control unit 33 determines that single update processing has been performed about each of the L trials. Thus, the trial number division control unit 33 increments the value of the iteration counter 32 by +1. When the value of the iteration counter 32 reaches N, the trial number division control unit 33 determines that the N update processing has been performed about each of the L trials. Thus, the trial number division control unit 33 increments the value of the trial set counter 30 by +1. When the value of the trial set counter 30 reaches ceil(M/L)−1, the trial number division control unit 33 notifies the comprehensive control unit 21 of completion of the update processing on the ceil(M/L) sets.

The iteration counter 32 counts from 0 to N. When the value reaches N−1, the data of the L trials outputted from the update processing unit 34 to the FIFO 25a is processed by the calculation unit 26, etc. Thereafter, when the value reaches N, the data is supplied from the FIFO 25c, and update processing is performed on the trials.

In addition, the trial number division control unit 33 specifies the addresses of the memories 23a to 23g in which the context information used by the update processing unit 34 or the calculation unit 26 illustrated in FIG. 2 is stored based on the value of the trial counter 31 and reads the context information from the memories 23a to 23g. In addition, the trial number division control unit 33 specifies the addresses of the memories 23a to 23g in which the context information updated by the update processing unit 34 or the calculation unit 26 is to be written based on the value of the trial counter 31 and writes the context information in the memories 23a to 23g.

In addition, the trial number division control unit 33 supplies the value of the iteration counter 32 to the update processing unit 34 and the calculation unit 26.

The update processing unit 34 includes an input selection determination unit 34a, selectors 34b to 34d, a state and energy update unit 34e, a minimum energy determination and update unit 34f, an output selection unit 34g, a temperature update unit 34h, an offset increment storage unit 34i, and an output selection unit 34k.

The input selection determination unit 34a receives the value of the iteration counter 32 from the trial number division control unit 33. When the value indicates an initial value (0), the input selection determination unit 34a outputs a selection signal that causes the selectors 34b to 34d to select the data from the input unit 22. When the value is 1 or more, the input selection determination unit 34a outputs a selection signal that causes the selectors 34b to 34d to select the context information from the memories 23a to 23c, 23e, and 23f.

The selector 34b selects and outputs the data supplied from the input unit 22 or the context information read from the memories 23a to 23c, based on the selection signal outputted by the input selection determination unit 34a. The data supplied from the input unit 22 to the selector 34b includes an initial state, an initial energy, and an initial minimum energy. The context information read from the memories 23a to 23c and supplied to the selector 34b includes the state and energy obtained in the previous update processing per trial and the minimum energy obtained up until the previous update processing.

The selector 34c selects and outputs the data supplied from the input unit 22 or the context information read from the memory 23e based on the selection signal outputted by the input selection determination unit 34a. The data supplied from the input unit 22 to the selector 34c includes an initial temperature. The context information read from the memory 23e and supplied to the selector 34c includes a temperature obtained in the previous update processing per trial.

The selector 34d selects and outputs the data supplied from the input unit 22 or the context information read from the memory 23f based on the selection signal outputted by the input selection determination unit 34a. The data supplied from the input unit 22 to the selector 34d includes an initial offset. The context information supplied from the memory 23f to the selector 34d includes an offset obtained in the previous update processing per trial.

Per trial, the state and energy update unit 34e receives the value of the iteration counter 32 from the trial number division control unit 33. When the value is an initial value (0), the state and energy update unit 34e does not acquire the data outputted by the update target selection unit 27 via the FIFO 25c. When the value is the initial value (0), the state and energy update unit 34e supplies the initial state, the initial energy, and the initial minimum energy outputted by the selector 34b to the minimum energy determination and update unit 34f without change.

In contrast, when the value of the iteration counter 32 is 1 or more, the state and energy update unit 34e acquires the data outputted by the update target selection unit 27 via the FIFO 25c. The data outputted by the update target selection unit 27 includes the update target bit information and an energy change (an update target energy change) obtained when the value of the corresponding update target bit changes. The update target bit information includes index information that identifies the update target bit and enable information that indicates whether to update the bit.

In a certain trial, when the enable information indicates false, the state and energy update unit 34e outputs the state and energy obtained in the previous update processing about the trial and the minimum energy obtained up until the previous update processing, the state, the energy, and the minimum energy being supplied from the selector 34b.

In the certain trial, when the enable information indicates true, the state and energy update unit 34e flips the value of the update target bit identified by the index information with respect to the state obtained in the previous update processing about the trial supplied from the selector 34b and outputs the updated state. In addition, the state and energy update unit 34e updates the energy by subtracting the energy change from the energy obtained in the previous update processing and outputs the updated energy. In addition, the state and energy update unit 34e outputs the minimum energy obtained up until the previous update processing.

Per trial, the minimum energy determination and update unit 34f compares the energy outputted by the state and energy update unit 34e with the minimum energy obtained up until the previous update processing. If the energy outputted by the state and energy update unit 34e is less than the minimum energy obtained up until the previous update processing, the minimum energy determination and update unit 34f outputs, as the minimum energy, the energy outputted by the state and energy update unit 34e. In this case, the minimum energy determination and update unit 34f outputs, as the minimum energy state, the state outputted by the state and energy update unit 34e. In contrast, if the energy outputted by the state and energy update unit 34e is greater than or equal to the minimum energy obtained up until the previous update processing, the minimum energy determination and update unit 34f outputs the minimum energy outputted by the state and energy update unit 34e without change. In this case, the minimum energy determination and update unit 34f outputs the minimum energy state outputted by the memory 23d.

The minimum energy determination and update unit 34f also outputs the current state and the current energy state supplied by the state and energy update unit 34e without change.

Per trial, when the value of the iteration counter 32 supplied from the trial number division control unit 33 is N, the output selection unit 34g supplies the current state, the current energy, and the current minimum energy outputted by the minimum energy determination and update unit 34f to the output unit 29. In this case, the output selection unit 34g may supply the minimum energy state to the output unit 29.

In contrast, when the value of the iteration counter 32 is less than N, the output selection unit 34g supplies the current state, the current energy, the current minimum energy, and the state corresponding to the current minimum energy outputted by the minimum energy determination and update unit 34f to the memories 23a to 23d. In this way, these items of context information are written in the memories 23a to 23d under the control of the trial number division control unit 33. In addition, the output selection unit 34g supplies the current state to the FIFO 25a.

Per trial, each time the value of the iteration counter 32 supplied by the trial number division control unit 33 reaches a predetermined number, the temperature update unit 34h updates the temperature. For example, each time the iteration counter 32 increments its value 1,000 times, the temperature update unit 34h drops the temperature. For example, assuming that the current temperature is denoted by $T_n$, the temperature update unit 34h updates the temperature $T_n$ to a temperature $T_{n+1}$ ($T_{n+1}=T_n \times 0.99$).

The offset increment storage unit 34i holds an offset increment.

Per trial, an offset update unit 34j receives the value of the iteration counter 32 from the trial number division control unit 33. When the value is an initial value (0), the offset update unit 34*j* supplies the initial offset outputted by the selector 34*d* to the output selection unit 34*k* without change.

In contrast, when the value of the iteration counter 32 is 1 or greater, the offset update unit 34*j* changes the offset based on the enable information included in the update target bit information supplied by the update target selection unit 27 via the FIFO 25*c*. When the enable information indicates false, the offset update unit 34*j* adds an offset increment to the offset obtained in the previous update processing supplied by the selector 34*d* and outputs the resultant offset. When the enable information indicates true, the offset update unit 34*j* resets the offset to 0.

Per trial, the output selection unit 34*k* receives the value of the iteration counter 32 from the trial number division control unit 33. When the value is less than N, the output selection unit 34*k* outputs data. The output selection unit 34*k* supplies the update target bit information supplied by the update target selection unit 27 via the FIFO 25*c* to the calculation unit 26, supplies the current temperature to the memory 23*e* and FIFO 25*a*, and supplies the current offset to the memory 23*f* and FIFO 25*a*. The current temperature and the current offset supplied to the memories 23*e* and 23*f* are written in the memories 23*e* and 23*f* under the control of the trial number division control unit 33.

The data in the update processing unit 34 in the dataflow control unit 24 as described above flows in a single direction. Thus, the update processing unit 34 is able to perform pipeline processing.

The control unit 12 in the optimization apparatus 10 according to the first embodiment is also achievable by the same configuration as that of the dataflow control unit 24 as illustrated in FIG. 3.

Example of Calculation Unit 26

Figure 4:
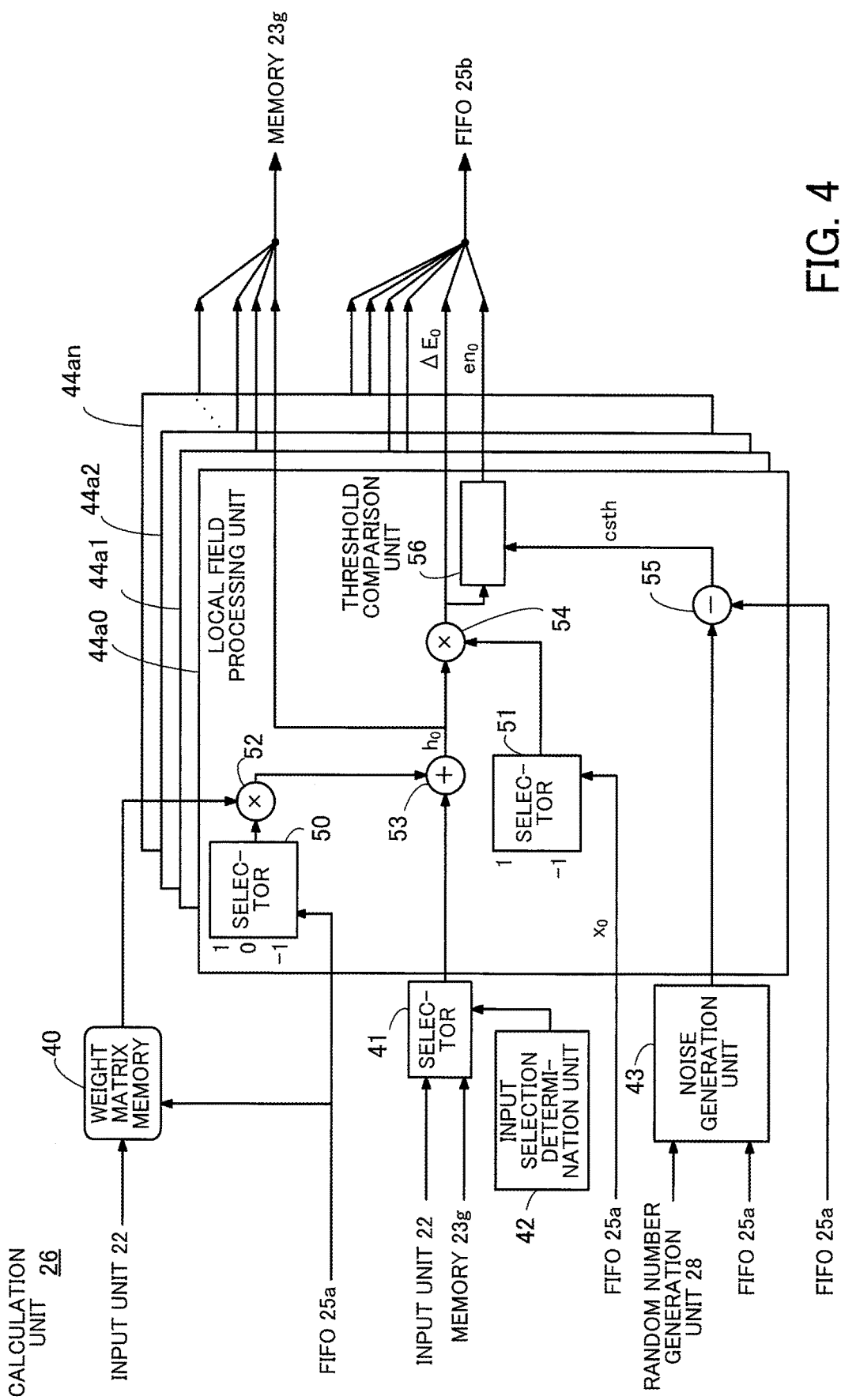
FIG. 4 illustrates an example of a calculation unit.

FIG. 4 illustrates an example of the calculation unit 26.

The calculation unit 26 includes a weight matrix memory 40, a selector 41, an input selection determination unit 42, a noise generation unit 43, and local field processing units 44*a*0 to 44*an*.

The weight matrix memory 40 holds a weight matrix including weight coefficients, each of which indicates a weight between bits. The weight matrix is previously read from the memory 20*c* before the operations of the trials are started and supplied to the weight matrix memory 40 via the input unit 22.

Next, per trial, the weight matrix memory 40 reads weight coefficients based on the index information included in the update target bit information supplied from the dataflow control unit 24 via the FIFO 25*a*. For example, when the i-th bit is specified in the index information, the weight matrix memory 40 reads weight coefficients that indicate weights, each of which is between the i-th bit and one of the other bits included in the ising model. When the number of bits included in the ising model is 1,024 and when each element (weight coefficient) in the weight matrix is signed 16-bit data, the weight coefficients are simultaneously read from the weight matrix memory 40 with a bit width of 16 bits×1,024 words.

The weight matrix memory 40 is, for example, 1,024 static random access memories (SRAMs) capable of holding data corresponding to 16 bits×1,024 words or 64 SRAMs capable of holding data corresponding to 256 bits×1,024 words.

The selector 41 receives a selection signal outputted by the input selection determination unit 42, an initial bias (read from the memory 20*c*) outputted by the input unit 22, and a bias (local field) updated by the previous processing of the calculation unit 26 read from the memory 23*g*. Next, per trial, the selector 41 selects and outputs the initial bias or the updated bias (local field) based on the selection signal.

Per trial, the input selection determination unit 42 receives the value of the iteration counter 32 included in the dataflow control unit 24. When the value is the initial value, the input selection determination unit 42 outputs a selection signal that causes the selector 41 to select the initial bias outputted by the input unit 22 to the selector 41. When the value is 1 or more, the input selection determination unit 42 outputs a selection signal that causes the selector 41 to select the bias (local field) read from the memory 23*g* to the selector 41.

The noise generation unit 43 generates a noise from a random number generated by the random number generation unit 28 and the current temperature supplied by the dataflow control unit 24 via the FIFO 25*a*. For example, when the random number rn is an odd number between 0 and 1,024, the noise is expressed by the following formula (4) by using the current temperature tmp.

$$\text{noise} = (\text{float})\log(rn/1{,}024.0f) \times \text{tmp} \qquad (4)$$

Formula (4) is transformed as noise={f(float)log(rn)−(float)log(1,024.0f)}×tmp.

In the above formula, (float)log(rn) is realized by using a DSP or a table data, and (float)log(1,024.0f) is a fixed value. The float calculation may be realized by using logic circuits that perform several stages of pipeline processing.

The number of local field processing units 44*a*0 to 44*an* arranged corresponds to the number of bits included in the ising model (the number of bits=n+1 in the example in FIG. 4). While a circuit example of the local field processing unit 44*a*0 will hereinafter be described, the other local field processing units 44*a*1 to 44*an* have the same circuit configuration.

The local field processing unit 44*a*0 includes selectors 50 and 51, a multiplier 52, an adder 53, a multiplier 54, a subtractor 55, and a threshold comparison unit 56.

The selector 50 receives enable information and a sign (indicating whether the change is from 1 to 0 or from 0 to 1) included in the update target bit information supplied from the dataflow control unit 24 via the FIFO 25*a*. When the enable information indicates false, the selector 50 selects and outputs 0. When the enable information indicates true and when the sign indicates that the change is from 1 to 0, the selector 50 selects and outputs −1. When the enable information indicates true and when the sign indicates that the change is from 0 to 1, the selector 50 selects and outputs 1. The values 1, 0, and −1 selected by the selector 50 are stored, for example, in a register (not illustrated).

When a first bit value $x_0$ of the current state supplied by the dataflow control unit 24 via the FIFO 25*a* is 1, the selector 51 selects and outputs 1. When the first bit value $x_0$ of the current state is 0, the selector 51 selects and outputs −1. These values 1 and −1 selected by the selector 51 are stored, for example, in a register (not illustrated).

The multiplier 52 in the local field processing unit 44*a*0 corresponding to the first bit is supplied with the weight coefficients specified by the index information, each of which indicates a weight between the first bit and one of the bits, of all the weight coefficients read from the weight matrix. Next, the multiplier 52 outputs the product of the weight coefficients and the value selected by the selector 50.

The adder 53 outputs the sum of the initial bias or the bias (local field) selected by the selector 41 and the product outputted by the multiplier 52. This sum is a local field $h_0$ about the first bit when i=0 in formula (3).

The multiplier 54 outputs the product of the local field $h_0$ and the value selected by the selector 51. This product is an energy change $\Delta E_0$ when i=0 in formula (2).

The subtractor 55 outputs a value (which will hereinafter be referred to as a threshold csth) obtained by subtracting an offset supplied by the dataflow control unit 24 via the FIFO 25a from the noise generated by the noise generation unit 43.

The threshold comparison unit 56 compares the energy change $\Delta E_0$ with the threshold csth and outputs an update determination result signal $en_0$ that indicates the comparison result. When $\Delta E_0 >$ csth, the threshold comparison unit 56 sets the value of the update determination result signal $en_0$ to a value (true (for example, 1)) indicating that updating the first bit value is accepted. When $\Delta E_0 \leq$ csth, the threshold comparison unit 56 sets the update determination result signal $en_0$ to a value (false (for example, 0)) indicating that updating the first bit value is not accepted.

As described above, when the enable information in the update target bit information indicates false, since the offset starts to rise by an offset increment, the threshold csth tends to drop. Thus, even in a case where the energy change $\Delta E_0$ indicates a small value or a minus value (change that results in a rise in the energy), the probability of $\Delta E_0 >$ csth is increased, and the state is updated more frequently.

The energy change $\Delta E_0$ generated by the local field processing unit 44a0 is supplied to the update target selection unit 27 via the FIFO 25b along with the update determination result signal $en_0$, as an energy change candidate used when the energy is updated. The local field $h_0$ is written in the memory 23g. While not illustrated, the data supplied from the local field processing unit 44a0 to the update target selection unit 27 includes index information indicating which bit corresponds to the energy change candidate.

The other local field processing units 44a1 to 44an perform like processing. The data including the energy change candidates corresponding to the respective bits is supplied to the update target selection unit 27 via the FIFO 25b.

After the weight matrix is written in the weight matrix memory 40 in the calculation unit 26, the data flows in a single direction. Thus, the calculation unit 26 is able to perform pipeline processing.

The calculation unit 13 in the optimization apparatus 10 according to the first embodiment is realized by the same configuration as that of the calculation unit 26 as illustrated in FIG. 4.

Example of Update Target Selection Unit 27

Figure 5:
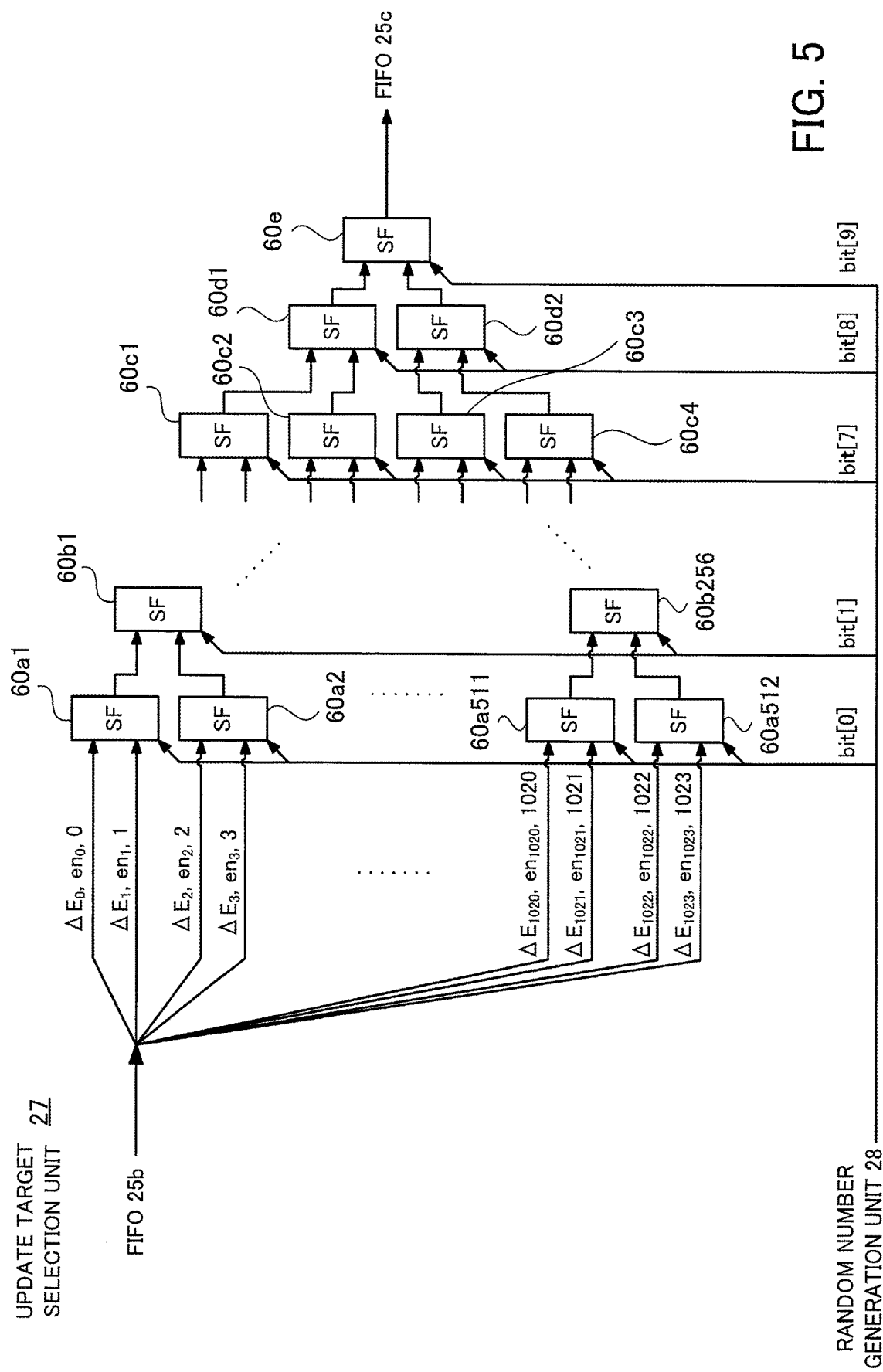
FIG. 5 illustrates an example of an update target selection unit.

FIG. 5 illustrates an example of the update target selection unit 27. FIG. 5 illustrates an example of the update target selection unit 27 when the number of bits included in the ising model is 1,024.

The update target selection unit 27 includes 10 stages of selection processing units ("SF" in FIG. 5) connected in a binary tree.

For example, 512 selection processing units 60a1 to 60a512 are arranged in the first stage, and 256 selection processing units 60b1 to 60b256 are arranged in the second stage. In addition, four selection processing units 60c1 to 60c4 are arranged in the eighth stage, and two selection processing units 60d1 and 60d2 are arranged in the ninth stage. In the final stage, a selection processing unit 60e is arranged.

In addition, a 1-bit random number generated by the random number generation unit 28 is supplied to the selection processing units in each stage. While a different 1-bit random number (bit[0] to bit[9]) is supplied to each stage in the example in FIG. 5, a different 1-bit random number may be supplied to each selection processing unit.

The FIFO 25b supplies the energy change candidates ($\Delta E_0$ to $\Delta E_{1023}$), each of which has been calculated for an individual bit, the update determination result signals $en_0$ to $en_{1023}$, each of which has been set for an individual bit, and index information (0 to 1023) to the selection processing units 60a1 to 60a512.

Each of the selection processing units 60a1 to 60a512 selects one of the two sets of energy change candidates, update determination result signals, and index information of the corresponding two bits, based on the corresponding random number and update determination result signals.

Each of the selection processing units in the second and subsequent stages selects one of the two sets of energy change candidates, update determination result signals, and index information outputted by the two selection processing units in the previous stage, based on the corresponding random number and update determination result signals.

For example, the selection processing unit 60b1 selects one of the two sets of energy change candidates, update determination result signals, and index information outputted by the selection processing units 60a1 and 60a2.

Figure 6:
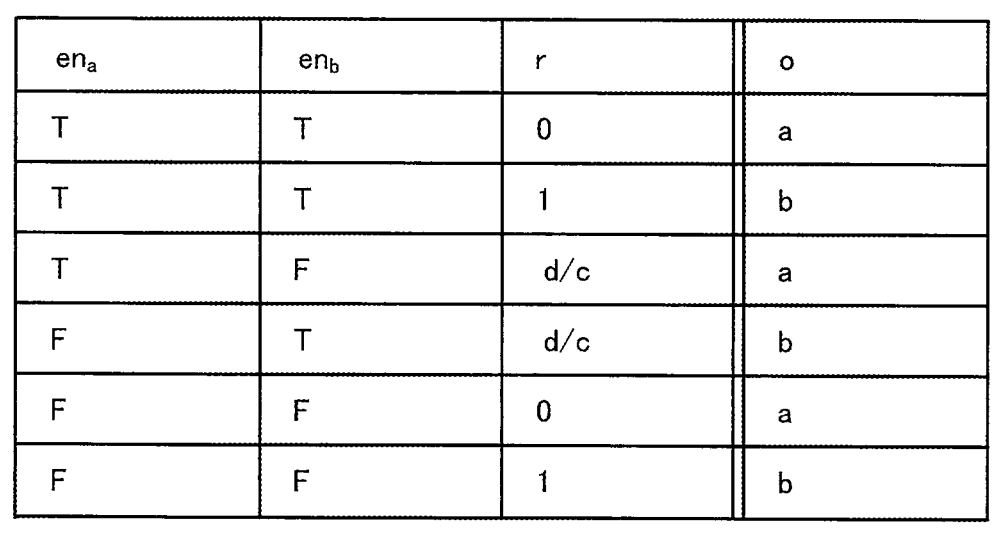

FIG. 6 is a truth table illustrating examples of data inputted to and outputted from a selection processing unit.

In the truth table in FIG. 6, update determination result signals $en_a$ and $en_b$ represent update determination result signals about the two bits specified by index information a and b inputted to a selection processing unit. In FIG. 6, "T" denotes true, and "F" denotes false. In addition, in FIG. 6, r denotes a 1-bit random number, and o denotes index information outputted by a selection processing unit. In FIG. 6, "d/c" signifies "don't care".

When a selection processing unit receives true as both the update determination result signals $en_a$ and $en_b$ and receives 0 as the random number r, the selection processing unit outputs index information a (and the energy change candidate about the bit specified by the index information a and the update determination result signal $en_a$). However, in this case, when the selection processing unit receives 1 as the random number r, the selection processing unit outputs the index information b (and the energy change candidate about the bit specified by the index information b and the update determination result signal $en_b$).

When the selection processing unit receives true as the update determination result signal $en_a$ and false as the update determination result signal $en_b$, regardless of the value of the random number r, the selection processing unit outputs the index information a (and the energy change candidate about the bit specified by the index information a and the update determination result signal $en_a$). When the selection processing unit receives false as the update determination result signal $en_a$ and true as the update determination result signal $en_b$, regardless of the value of the random number r, the selection processing unit outputs the index information b (and the energy change candidate about the bit specified by the index information b and the update determination result signal $en_b$).

When the selection processing unit receives false as both the update determination result signals $en_a$ and $en_b$ and receives 0 as the random number r, the selection processing unit outputs the index information a (and the energy change candidate about the bit specified by the index information a and the update determination result signal $en_a$). In this case, when the selection processing unit receives 1 as the random number r, the selection processing unit outputs the index information b (and the energy change candidate about the bit specified by the index information b and the update determination result signal $en_b$).

The above processing is performed by each of the selection processing units. The index information and the update determination result signal outputted by the selection processing unit 60e are included in the update target bit information supplied to the dataflow control unit 24 via the FIFO 25c. The enable information included in the update target bit information is the update determination result signal outputted by the selection processing unit 60e. In addition, the energy change candidate outputted by the selection processing unit 60e in the last stage is the update target energy change supplied to the dataflow control unit 24 via the FIFO 25c.

The data flows in a single direction in the above update target selection unit 27. Thus, the update target selection unit 27 is able to perform pipeline processing.

The selection unit 14 in the optimization apparatus 10 according to the first embodiment is realized by the same configuration as that of the update target selection unit 27 as illustrated in FIG. 5.

Example of Pipeline Processing

As described above, the dataflow control unit 24, the calculation unit 26, and the update target selection unit 27 are able to perform pipeline processing. The optimization apparatus 20 in which the dataflow control unit 24, the calculation unit 26, and the update target selection unit 27 are connected in a ring via the FIFOs 25a to 25c is able to simultaneously process the L trials by performing pipeline processing.

Figure 7:
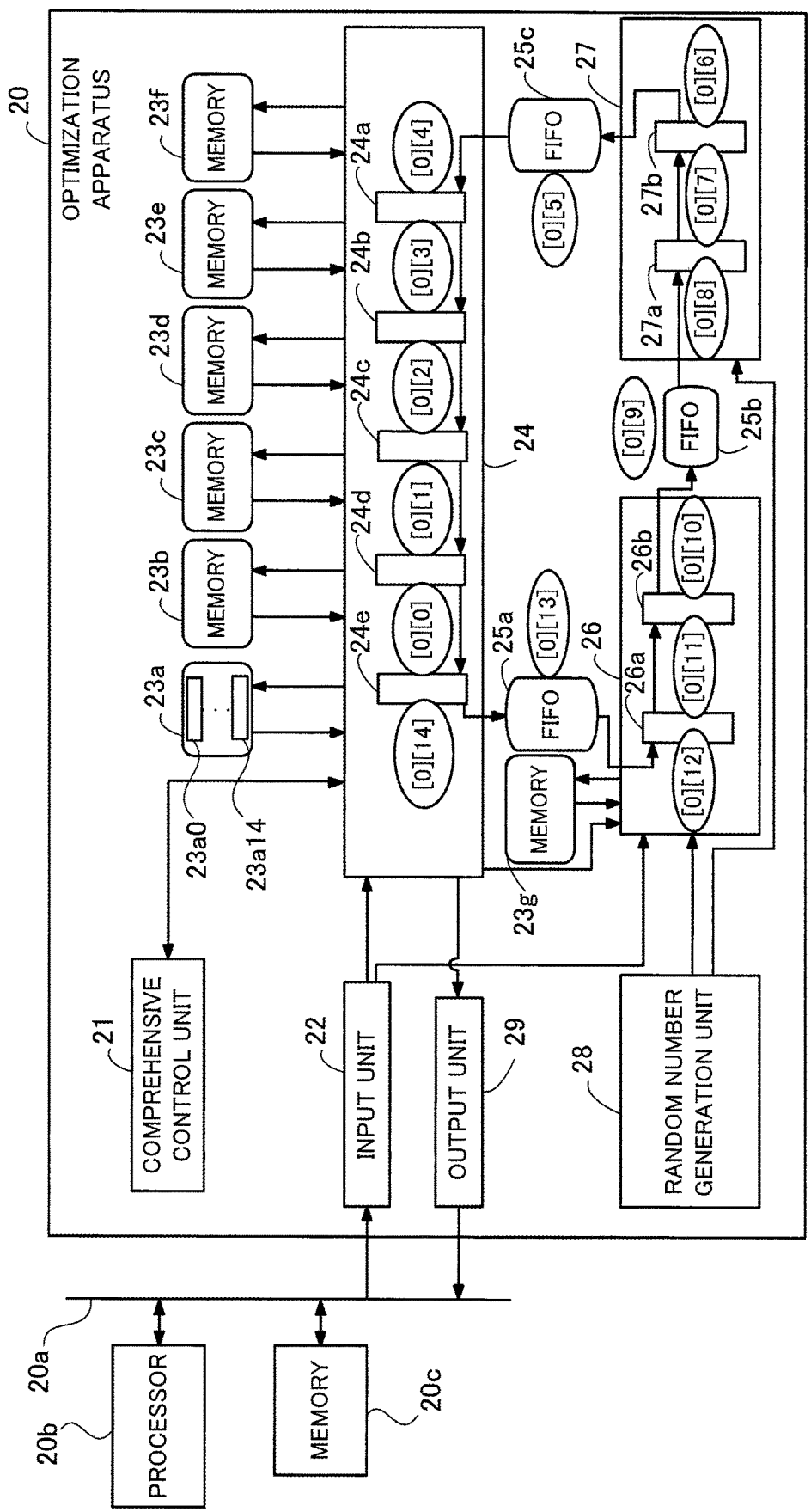
FIG. 7 illustrates examples of data about individual trials on which pipeline processing is performed in a certain clock cycle.

FIG. 7 illustrates examples of data about individual trials on which pipeline processing is performed in a certain clock cycle.

In FIG. 7, the pipeline in the dataflow control unit 24 is expressed by using registers 24a to 24e. Each of the registers 24a to 24e is realized, for example, as a register connected between circuit units, each of which performs processing in one clock cycle in the update processing unit 34 illustrated in FIG. 3. In the example in FIG. 7, processing of six clock cycles is performed in the pipeline in the dataflow control unit 24.

In addition, in FIG. 7, the pipeline in the calculation unit 26 is expressed by using registers 26a and 26b. Each of the registers 26a and 26b is realized, for example, as a register connected between circuit units, each of which performs processing in one clock cycle in the calculation unit 26 illustrated in FIG. 4. In the example in FIG. 7, processing of three clock cycles is performed in the pipeline in the calculation unit 26.

In addition, in FIG. 7, the pipeline in the update target selection unit 27 is expressed by using registers 27a and 27b. Each of the registers 27a and 27b is realized, for example, as a register connected between circuit units, each of which performs processing in one clock cycle in the update target selection unit 27 illustrated in FIG. 5. In the example in FIG. 7, processing of three clock cycles is performed in the pipeline in the update target selection unit 27.

In addition, in the example in FIG. 7, each of the FIFOs 25a to 25c has one entry and holds data about an individual trial for one clock cycle.

In the above example, the number of clock cycles needed for single update processing is 15 (6+3+3+1×3=15). When the upper limit of the number of trials for which each of the memories 23a to 23g is able to store context information is 15 or more, the optimization apparatus 20 is able to process 15 trials simultaneously.

In FIG. 7, the data in the first update processing about the 15 trials is denoted by [0][0] to [0][14]. Specifically, [n][m] denotes data in the n-th update processing about trial m. The memories 23a to 23g hold the context information about the 15 trials. For example, the memory 23a holds context information 23a0 to 23a14 about the 15 trials.

In the example in FIG. 7, the data [0][0] in the first update processing about the first trial is being processed by a circuit unit that performs processing in the fifth clock cycle in the dataflow control unit 24. At this point, the data [0][1] in the first update processing about the second trial is being processed by a circuit unit that performs processing in the fourth clock cycle in the dataflow control unit 24. In addition, at this point, for example, the data [0][7] in the first update processing about the eighth trial is being processed by a circuit unit that performs processing in the second clock cycle in the update target selection unit 27.

Figure 8:
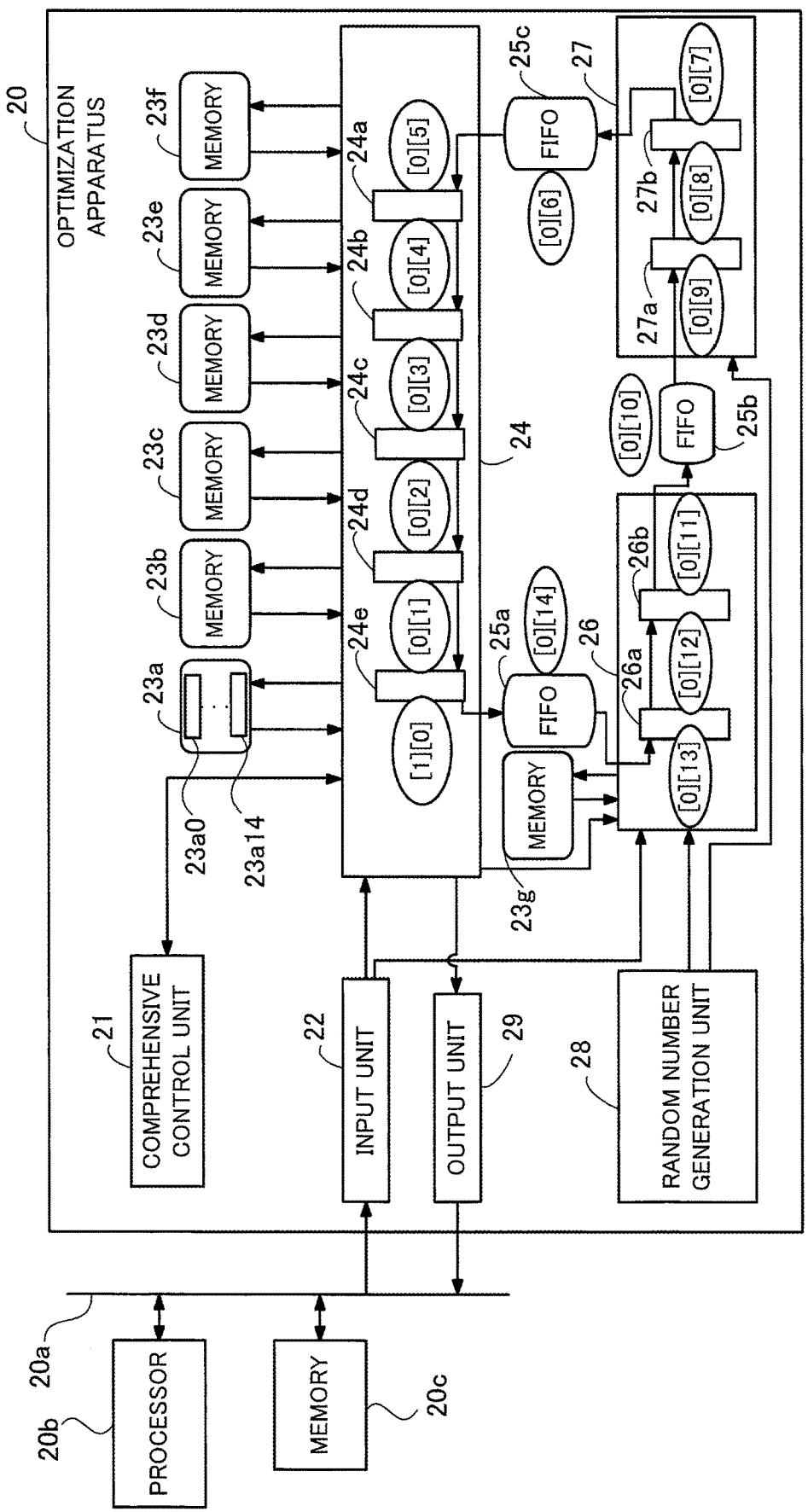
FIG. 8 illustrates examples of data about the individual trials on which the pipeline processing is performed one clock cycle after the state in FIG. 7.

FIG. 8 illustrates examples of the data about the individual trials on which the pipeline processing is performed one clock cycle after the state in FIG. 7.

One clock cycle after the state in FIG. 7, the data about the individual trials has shifted to the respective circuit units (or the FIFOs 25a to 25c) that perform processing in the next clock cycle. In the example in FIG. 8, the data [1][0] in the second update processing about the first trial is being processed by a circuit unit that performs processing in the sixth clock cycle in the dataflow control unit 24. At this point, the data [0][1] in the first update processing about the second trial is being processed by a circuit unit that performs processing in the fifth clock cycle in the dataflow control unit 24. In addition, at this point, for example, the data [0][7] in the first update processing about the eighth trial is being processed by a circuit unit that performs processing in the third clock cycle in the update target selection unit 27.

As described above, the data about the individual trials shifts counterclockwise through the ring pipeline configured by the dataflow control unit 24, the calculation unit 26, the update target selection unit 27, and the FIFOs 25a to 25c in the example in FIGS. 7 and 8.

When each of the FIFOs 25a to 25c has two or more entries, the optimization apparatus 20 is able to process more trials simultaneously.

Figure 9:
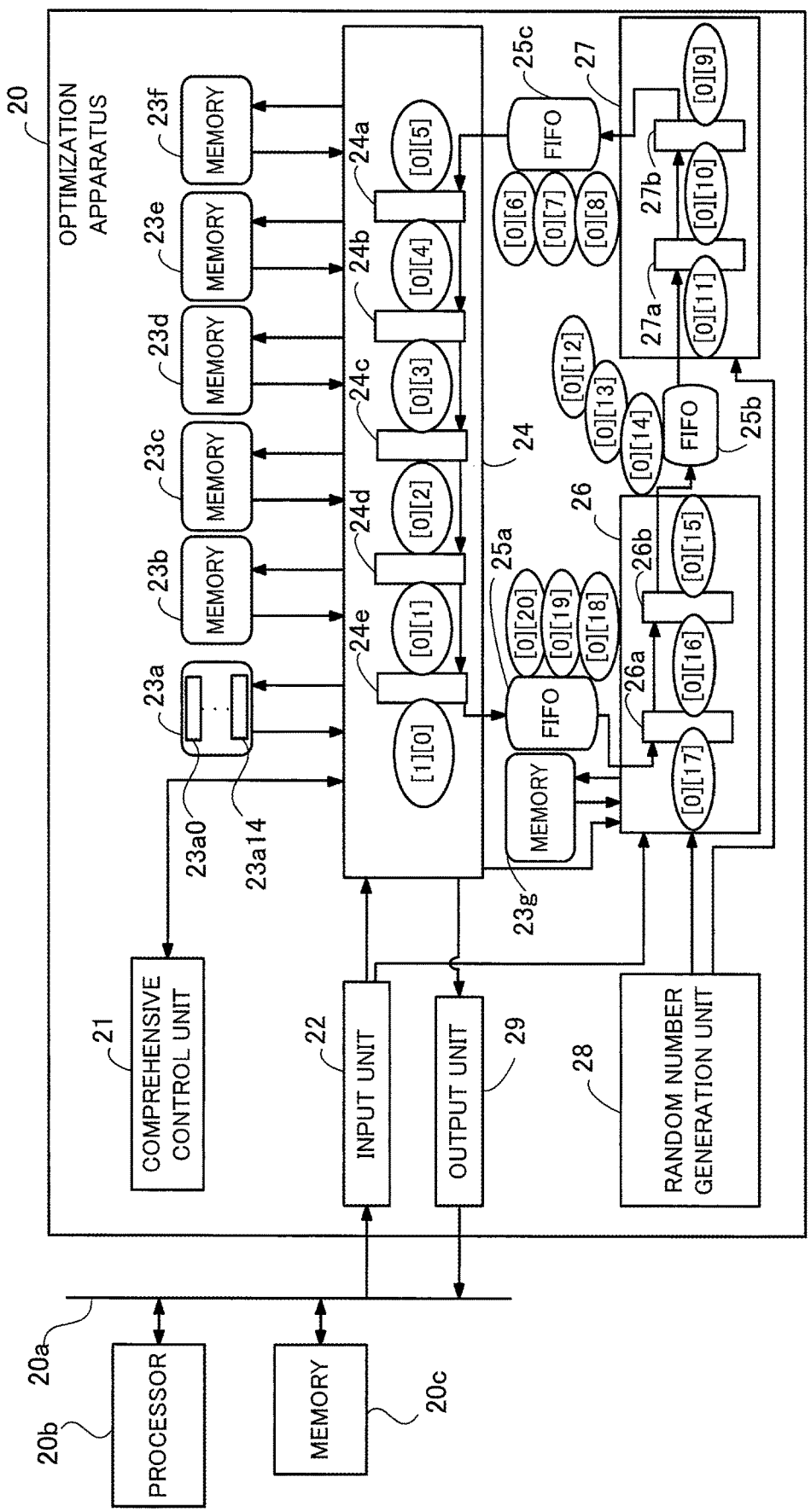
FIG. 9 illustrates an example of pipeline processing when an individual FIFO has three entries.

FIG. 9 illustrates an example of pipeline processing when each of the FIFOs has three entries.

In the example in FIG. 9, each of the FIFOs 25a to 25c has three entries and holds three trial data. Thus, the optimization apparatus 20 is able to process a total of 21 trial data simultaneously.

Example of Overall Operation

Hereinafter, an overall operation of the optimization apparatus 20 according to the second embodiment will be described with reference to a flowchart.

Figure 10:
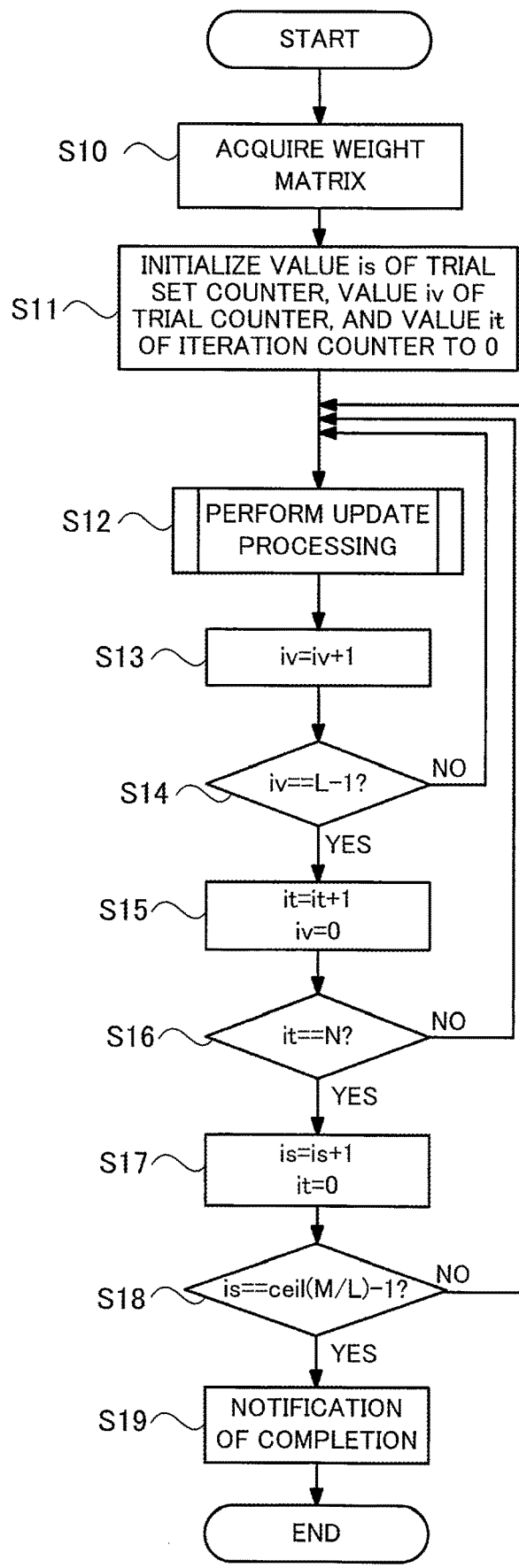
FIG. 10 is a flowchart illustrating an example of an overall operation of the optimization apparatus.

FIG. 10 is a flowchart illustrating an example of an overall operation of the optimization apparatus 20.

First, the input unit 22 in the optimization apparatus 20 acquires a weight matrix from the memory 20c (step S10). The weight matrix is stored in the weight matrix memory 40 in the calculation unit 26.

Next, the trial number division control unit 33 in the dataflow control unit 24 initializes the value (is) of the trial set counter 30, the value (iv) of the trial counter 31, and the value (it) of the iteration counter 32 to 0 (step S11). Next, single update processing in SA is performed (step S12). The flow of the update processing will be described below.

Completion of updating the state, the energy, and the like in the update processing unit 34 corresponds to completion of single update processing about a single trial. Thus, in this case, the trial number division control unit 33 increments the value iv by +1 (step S13).

Next, the trial number division control unit 33 determines whether the value iv has reached L−1 (step S14).

The value iv having reached L−1 corresponds to completion of single update processing about each of the L trials. Thus, the trial number division control unit 33 increments the value it by +1. In addition, the trial number division control unit 33 initializes the value iv to 0 (step S15). If the value iv has not reached L−1 yet, the processing returns to step S12.

Subsequently, the trial number division control unit 33 determines whether the value it has reached N (step S16). The value it having reached N corresponds to completion of update processing N times about each of the L trials. Thus, the trial number division control unit 33 increments the value is by +1. In addition, the trial number division control unit 33 initializes the value it to 0 (step S17). If the value it has not reached N yet, the processing returns to step S12.

Next, the trial number division control unit 33 determines whether the value is has reached ceil(M/L)−1 (step S18). If the value is has reached ceil(M/L)−1, the trial number division control unit 33 notifies the comprehensive control unit 21 of completion of the update processing on the ceil(M/L) sets. Thus, under the control of the comprehensive control unit 21, the output unit 29 notifies the external processor 20b of the completion of the optimization processing (step S19), and the optimization processing is ended. If the value is has not reached ceil(M/L)−1 yet, the processing returns to step S12.

Next, the flow of the update processing in step S12 in FIG. 10 will be described.

Figure 11:
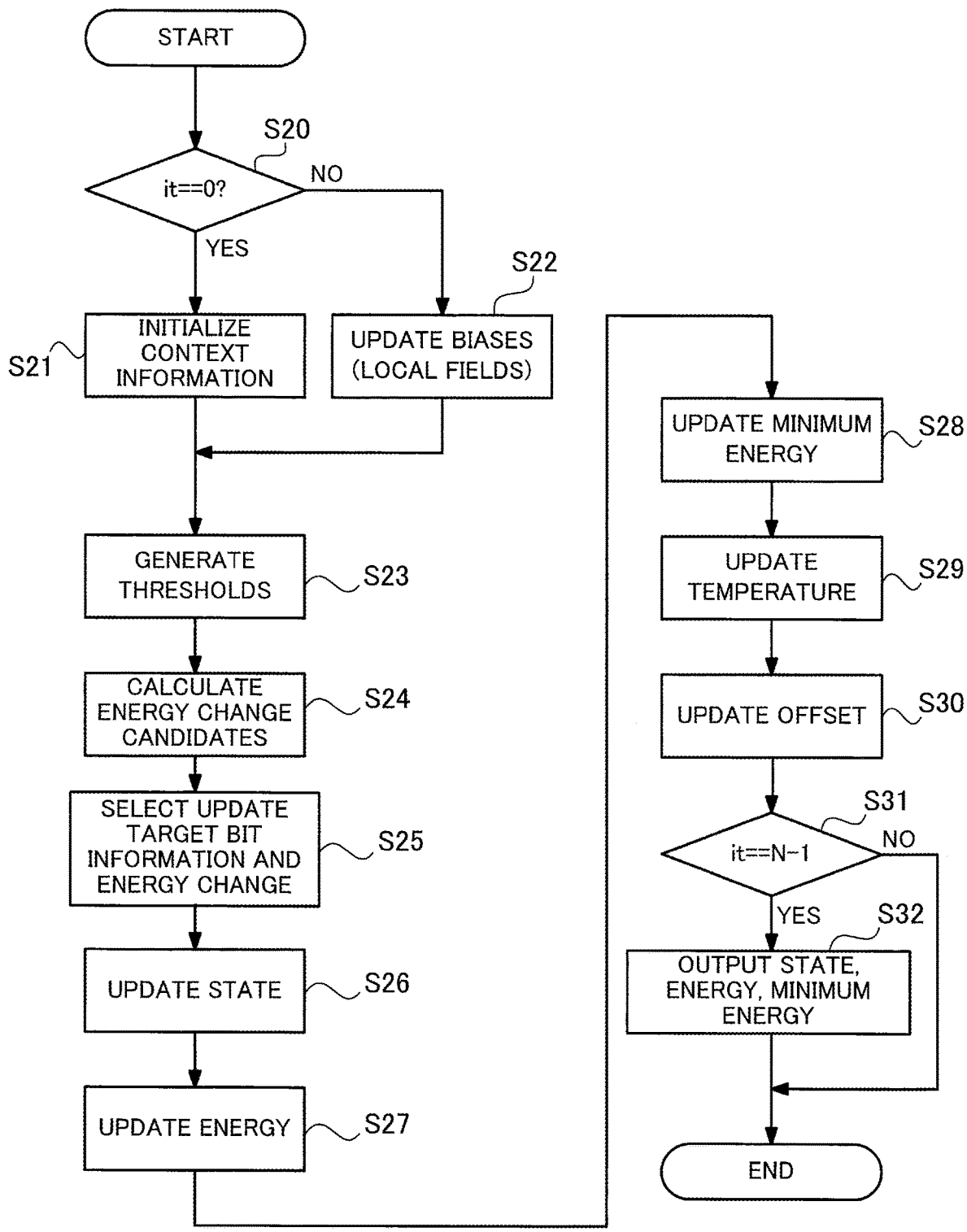
FIG. 11 is a flowchart illustrating an example of update processing.

FIG. 11 is a flowchart illustrating an example of the update processing.

The input selection determination units 34a and 42 in the dataflow control unit 24 and the calculation unit 26, respectively, determine whether the value it is 0 (step S20). If the value it is 0, the input selection determination unit 34a causes the selectors 34b to 34d to select the initial values of the various kinds of context information supplied by the input unit 22. In addition, the input selection determination unit 42 causes the selector 41 to select the individual initial values (initial biases) in the context information supplied by the input unit 22. Consequently, the context information is initialized (step S21).

If the value it is 1 or more, the input selection determination unit 34a causes the selectors 34b to 34d to select the context information read from the memories 23a to 23c, 23e, and 23f. In addition, the input selection determination unit 42 causes the selector 41 to select the biases (local fields) read from the memory 23g. Consequently, the biases (local fields) are updated by the respective local field processing units 44a0 to 44an (step S22).

After step S21 or S22, the calculation unit 26 generates thresholds by using the noise generation unit 43 and the subtractor 55 (step S23). Next, the calculation unit 26 calculates energy change candidates by using the local field processing units 44a0 to 44an (step S24).

Next, the update target selection unit 27 performs the above processing to select update target bit information and an update target energy change (step S25).

The state and energy update unit 34e in the dataflow control unit 24 updates the state (step S26) and the energy (step S27) based on the update target bit information and update target energy change selected in step S25.

Next, per trial, if the updated energy is less than the minimum energy obtained up until the previous update processing, the minimum energy determination and update unit 34f updates the minimum energy to the updated energy (step S28).

In addition, per trial, each time the iteration counter 32 performs a predetermined number of increment operations, the temperature update unit 34h updates the temperature (step S29). If the enable information in the update target bit information indicates false, the offset update unit 34j updates the offset by adding an offset increment to the offset (step S30).

Next, the trial number division control unit 33 determines whether the value it has reached N−1 (step S31).

If the value it has reached N−1, the trial number division control unit 33 reads, for example, the state, the energy, the minimum energy stored in the respective memories 23a to 23c and causes the output unit 29 to output the read data (step S32). After step S32 or if the value it is less than N−1, the single update processing is ended.

The steps in FIG. 11 may be performed in a different order as appropriate. For example, step S30 may be performed immediately before step S29.

Before advantageous effects of the optimization apparatus 20 according to the second embodiment are described, an optimization apparatus that does not perform pipeline processing will be described as a comparative example.

COMPARATIVE EXAMPLE

Figure 12:
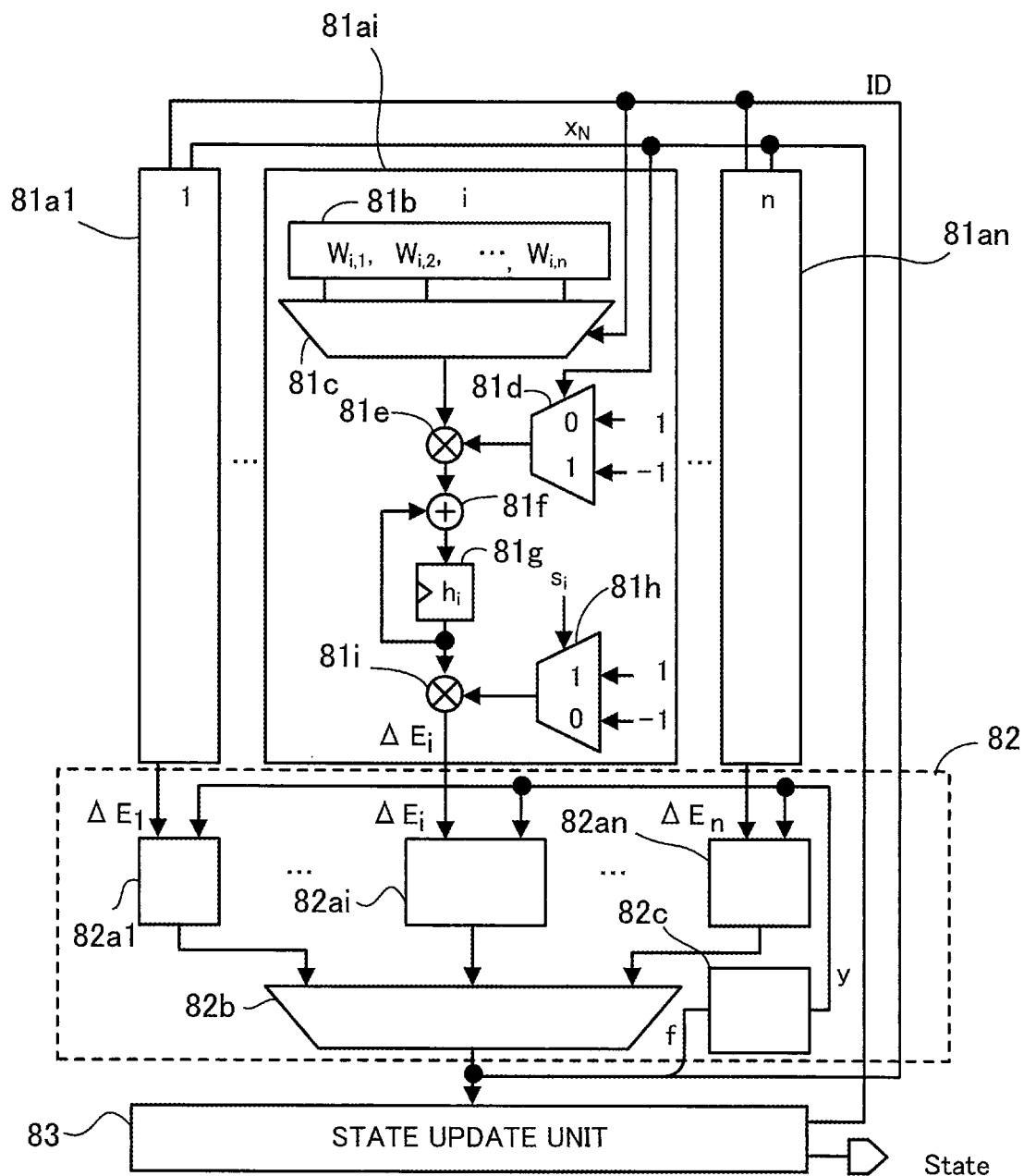
FIG. 12 illustrates an optimization apparatus according to a comparative example.

FIG. 12 illustrates an optimization apparatus 80 according to a comparative example.

The optimization apparatus 80 includes energy calculation units 81a1 to 81an, a transition control unit 82, and a state update unit 83.

The energy calculation units 81a1 to 81an have the same function as that of a part of the calculation unit 26 in the optimization apparatus 20 according to the second embodiment and calculate and output energy change candidates ($\Delta E_1, \ldots, \Delta E_1, \ldots, \Delta E_n$).

For example, the energy calculation unit 81ai includes a register 81b, selectors 81c and 81d, a multiplier 81e, an adder 81f, a register 81g, a selector 81h, and a multiplier 81i.

The register 81b holds weight coefficients ($W_{i,1}$, $W_{i,2}, \ldots, W_{i,n}$), each of which indicates a weight between the i-th bit and one of the other bits.

The selector 81c selects and outputs one of the weight coefficients stored in the register 81b, based on an index information ID outputted by the transition control unit 82.

The selector 81d selects and outputs 1 or −1, based on an updated bit value $x_N$ outputted by the state update unit 83. When the updated value is 0, the selector 81d selects and outputs −1. When the updated value is 1, the selector 81d selects and outputs 1.

The multiplier 81e outputs the product of the weight coefficient outputted by the selector 81c and the value outputted by the selector 81d.

The adder 81f outputs the sum of the product outputted by the multiplier 81e and a value stored in the register 81g.

The register 81g captures a value outputted by the adder 81f in synchronization with a clock signal (not illustrated). The register 81g is, for example, a flip-flop. The value stored in the register 81g is the above local field $h_i$.

When the i-th bit value of the current state is 1, the selector 81h selects and outputs 1. When the i-th bit value of the current state is 0, the selector 81h selects and outputs −1.

The multiplier 81i outputs the product of the local field $h_i$ outputted by the register 81g and the value outputted by the selector 81h as an energy change ($\Delta E_i$).

The transition control unit 82 includes circuit units 82a1, . . . , 82ai, . . . , 82an, a selector 82b, and an offset control circuit 82c.

The circuit units 82a1 to 82an have the same functions as those of the noise generation unit 43, the subtractor 55, and the threshold comparison unit 56 in the calculation unit 26 in the optimization apparatus 20 according to the second embodiment. The selector 82b has the same function as that of the update target selection unit 27 in the optimization apparatus 20 according to the second embodiment. In addition, the offset control circuit 82c has the same function as that of the offset update unit 34j in the dataflow control unit 24 in the optimization apparatus 20 according to the second embodiment. In FIG. 12, f denotes enable information, and y denotes an offset.

The state update unit 83 has the same function as that of the state and energy update unit 34e in the dataflow control unit 24 in the optimization apparatus 20 according to the second embodiment and updates and outputs the state (State), based on the enable information f and the index information ID outputted by the transition control unit 82. In addition, the state update unit 83 outputs the updated bit value $x_N$.

Comparison between effects of optimization apparatus 20 according to second embodiment and effects of optimization apparatus 80

Hereinafter, D denotes the communication overhead time needed for data transfer among the optimization apparatus 20 or 80, the processor 20b, and the memory 20c, and activation and termination control per trial. In addition, $R_2$ and $R_1$ denote clock cycle numbers needed by the optimization apparatuses 20 and 80, respectively, to perform single update processing.

In this case, run time $T_i$ of the N×M update processing in the optimization apparatus 80 according to the comparative example is expressed as $T_1 = R_1 \times N \times M + D \times M$.

In contrast, run time $T_2$ of the N×M update processing in the optimization apparatus 20 according to the second embodiment is expressed as $T_2 = L \times N \times \text{ceil}(M/L) + R_2 + D$. In the optimization apparatus 20, the time for which single update processing is performed in L trials and the time for which the next update processing is performed in the L trials overlap by $R_2$. In the above formula for the run time $T_2$, $R_2$ that occurs at the end of the update processing in the last trial is added. Why D is added in the above formula for the run time $T_2$ will be described below.

It is often the case that $R_2$ is sufficiently smaller than N (for example, $R_2=20$, $N=1,000,000$). Thus, it is possible to approximate the above formula for the run time $T_2$ as $T_2 = L \times N \times \text{ceil}(M/L) + D$. In addition, when L is adjustable between the above minimum and maximum values and when M is divisible by L, $T_2 = N \times M + D$. Thus, the run time $T_2$ is approximately $1/R_1$ of the run time $T_1$ of the optimization apparatus 80. In addition, communication overhead time for the activation and termination control is reduced to 1/M.

Figure 13:
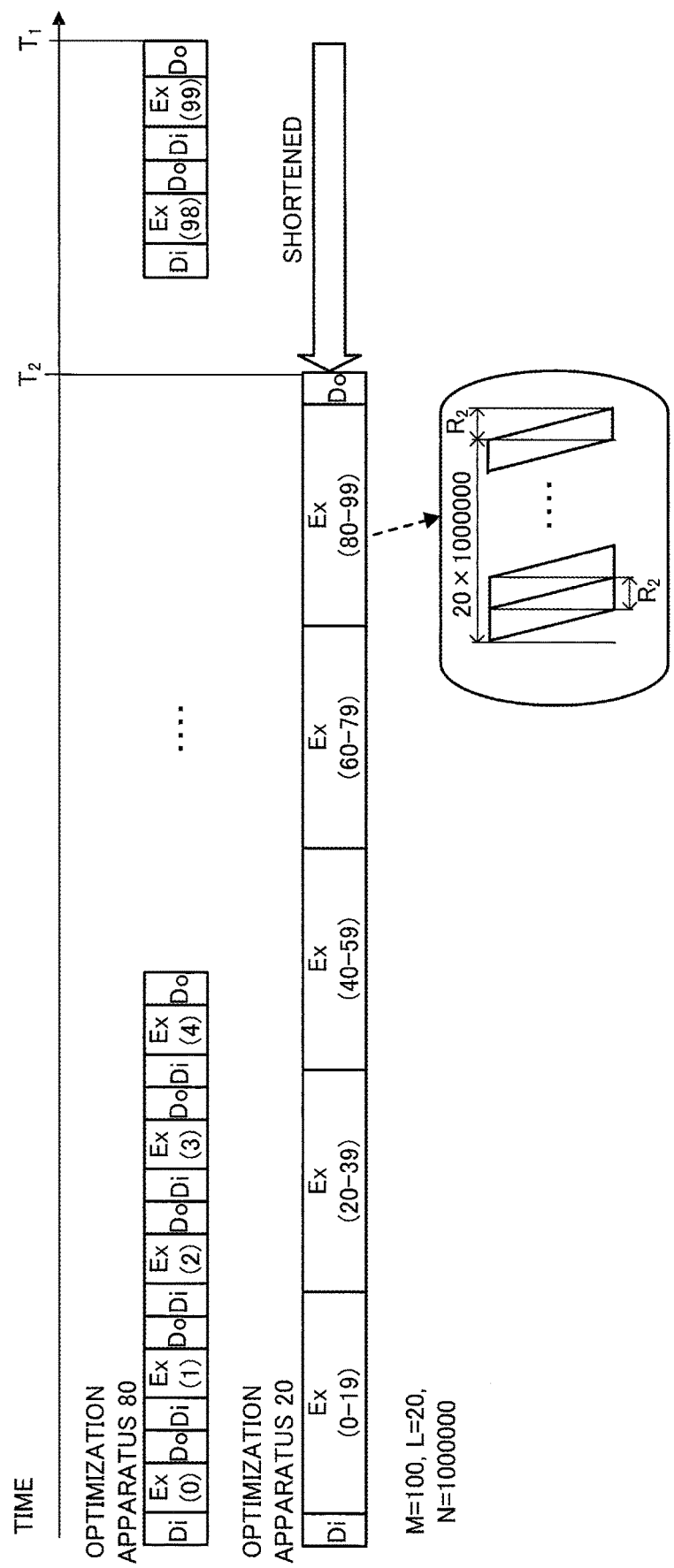
FIG. 13 illustrates an example in which the run time of update processing performed by the optimization apparatus according to the second embodiment is compared with the run time of update processing performed by the optimization apparatus according to the comparative example.

FIG. 13 illustrates an example in which the run time of update processing performed by the optimization apparatus 20 according to the second embodiment is compared with the run time of update processing performed by the optimization apparatus 80 according to the comparative example.

FIG. 13 illustrates an example in which the run time $T_1$ and the run time $T_2$ are compared with each other when $M=100$, $L=20$, and $N=1,000,000$.

Di denotes the communication overhead time needed for data input from the memory 20c to the optimization apparatus 20 or 80 per trial and for activation control. Do denotes the communication overhead time needed for data output to the memory 20c from the optimization apparatus 20 or 80 per trial and for termination control. Di+Do=D.

Ex denotes the processing time when the update processing in each of the m trials ($0 \leq m \leq 99$) is repeated N times ($N=1,000,000$) in the optimization apparatus 80. For example, Ex(0) denotes the processing time when the update processing in trial 0 is repeated N times ($N=1,000,000$). In the optimization apparatus 20, Ex denotes the processing time when the update processing in 20 trials is simultaneously repeated N times ($N=1,000,000$). For example, Ex(0-19) denotes the processing time when the update processing in the trials 0 to 19 is repeated N times ($N=1,000,000$).

In the optimization apparatus 80, Di and Do occur in each of the trials 0 to 99. Thus, the run time $T_1$ is represented as $T_1 = R_1 \times 1,000,000 \times 100 + D \times 100$.

In contrast, in the optimization apparatus 20, every 20 trials are simultaneously performed, and Di in the trials 1 to 99 and Do in the trials 0 to 98 are hidden in the Ex periods. This is because, as illustrated in FIG. 11, the data input (initialization of the context information) is performed in the initial update processing (when it=0), and the data output (output of the state, the energy, and the minimum energy) is performed in the update processing when the value it=N−1.

Thus, the run time $T_2$ is expressed as $T_2 = 1,000,000 \times 100 + R_2 + D$.

As described above, since the optimization apparatus 20 brings the operating ratio of each of the dataflow control unit 24, the calculation unit 26, and the update target selection unit 27 close to 100%, the optimization apparatus 20 has improved calculation efficiency and needs less calculation time than the optimization apparatus 80 that does not perform pipeline processing.

While an aspect of the optimization apparatuses and control methods thereof based on embodiments has been described, the above description is only an example. The embodiments are not limited to the above description.

In an aspect, the embodiments improve the calculation efficiency.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus comprising:
   a storage unit that holds context information including a minimum energy state, a current state, a minimum energy, a current energy, a temperature, and a bias about each of a plurality of trials;
   a control unit that includes a repetition number counting unit for counting how many times update processing has been repeated in the each of the plurality of trials and a trial number counting unit for counting how many trials have been performed and that repeats update control about the update processing a certain number of times in the each of the plurality of trials on the context information stored in the storage unit, based on spin information and an update target energy change;

a calculation unit that calculates a plurality of energy change candidates, based on a generated random number, a stored weight, the spin information, and the current state and the temperature that have been updated by the update control; and a selection unit that selects the update target energy change from the plurality of energy change candidates calculated by the calculation unit, based on a random number.

2. The optimization apparatus according to claim 1, wherein a first register of the control unit, a second register of the calculation unit, and a third register of the selection unit are connected in a ring.

3. The optimization apparatus according to claim 1, wherein
the context information further includes an offset, and
the control unit updates the context information, based on an offset increment, the spin information, and the update target energy change.

4. The optimization apparatus according to claim 1, wherein the control unit further includes a trial set counting unit for counting trial sets, each of which is a set of trials among the plurality of trials, and repeats the update control the certain number of times in each trial in each of the trial sets on the context information stored in the storage unit, based on the spin information and the update target energy change.

5. The optimization apparatus according to claim 1, wherein the control unit and the calculation unit are connected to each other via a first-in first-out (FIFO) memory that includes a plurality of entries.

6. The optimization apparatus according to claim 1, wherein the calculation unit and the selection unit are connected to each other via a FIFO memory that includes a plurality of entries.

7. The optimization apparatus according to claim 1, wherein the selection unit and the control unit are connected to each other via a FIFO memory that includes a plurality of entries.

8. The optimization apparatus according to claim 1, wherein each of the control unit, the calculation unit, and the selection unit processes a different trial in a same clock cycle.

9. A control method of an optimization apparatus, the control method comprising:

holding, by a storage unit of the optimization apparatus, context information that includes a minimum energy state, a current state, a minimum energy, a current energy, a temperature, and a bias about each of a plurality of trials;

repeating, by a control unit of the optimization apparatus that includes a repetition number counting unit for counting how many times update processing has been repeated in the each of the plurality of trials and a trial number counting unit for counting how many trials have been performed, update control about the update processing a certain number of times in the each of the plurality of trials on the context information stored in the storage unit, based on spin information and an update target energy change;

calculating, by a calculation unit of the optimization apparatus, a plurality of energy change candidates, based on a generated random number, a stored weight, the spin information, and the current state and the temperature that have been updated by the update control; and selecting, by a selection unit of the optimization apparatus, the update target energy change from the plurality of energy change candidates calculated by the calculation unit, based on a random number.

* * * * *